(12) United States Patent
Hayashi et al.

(10) Patent No.: US 11,684,823 B2
(45) Date of Patent: Jun. 27, 2023

(54) GOLF BALL

(71) Applicant: Sumitomo Rubber Industries, Ltd., Hyogo (JP)

(72) Inventors: Kai Hayashi, Kobe (JP); Takahiro Shigemitsu, Kobe (JP); Kazuyoshi Shiga, Kobe (JP); Yoshihiko Komori, Kobe (JP); Toshiyuki Tarao, Kobe (JP); Masatoshi Yokota, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/105,802

(22) Filed: Nov. 27, 2020

(65) Prior Publication Data

US 2021/0162268 A1    Jun. 3, 2021

(30) Foreign Application Priority Data

Nov. 29, 2019  (JP) ................................ 2019-216325

(51) Int. Cl.

| | |
|---|---|
| *C08L 23/00* | (2006.01) |
| *C08L 75/00* | (2006.01) |
| *A63B 37/12* | (2006.01) |
| *A63B 37/00* | (2006.01) |
| *C09K 11/02* | (2006.01) |
| *C08L 75/08* | (2006.01) |

(52) U.S. Cl.
CPC .... *A63B 37/00376* (2020.08); *A63B 37/0024* (2013.01); *A63B 37/0074* (2013.01); *A63B 37/00373* (2020.08); *C08L 75/08* (2013.01); *C09K 11/02* (2013.01); *A63B 37/0075* (2013.01); *A63B 37/0076* (2013.01); *A63B 2209/00* (2013.01); *C08L 2201/08* (2013.01); *C08L 2205/18* (2013.01); *C08L 2310/00* (2013.01)

(58) Field of Classification Search
CPC ........ A63B 37/00691; A63B 37/00495; A63B 37/00373; A63B 37/00376; C09K 11/02; C08L 2201/08; C08L 2205/18
See application file for complete search history.

(56) References Cited

U.S. PATENT DOCUMENTS

| 10,786,707 B2 * | 9/2020 | Namba .............. A63B 37/0022 |
| 2007/0015602 A1 * | 1/2007 | Watanabe .......... A63B 37/0065 |
| | | 473/371 |

(Continued)

FOREIGN PATENT DOCUMENTS

| JP | 2010-012250 A | 1/2010 |
| JP | 2010-246642 A | 11/2010 |
| JP | 2018-102561 A | 7/2018 |

OTHER PUBLICATIONS

Sinloihi FX-300—FX Series color product description—one page (Year: 2022).*

*Primary Examiner* — John E Simms, Jr.
(74) *Attorney, Agent, or Firm* — Studebaker & Brackett PC

(57) ABSTRACT

An object of the present invention is to provide a golf ball having excellent color development stability. The present invention provides a golf ball comprising a core and a cover covering the core, wherein the cover is formed from a resin composition containing a first base resin and a fluorescent pigment, and the fluorescent pigment has a number-based cumulative median size of 2.5 μm or more.

13 Claims, 1 Drawing Sheet

(56) References Cited

U.S. PATENT DOCUMENTS

| | | | | |
|---|---|---|---|---|
| 2008/0182683 | A1* | 7/2008 | Hirau | A63B 43/06 473/377 |
| 2010/0004072 | A1* | 1/2010 | Komatsu | A63B 37/0022 473/377 |
| 2010/0261550 | A1* | 10/2010 | Nagasawa | A63B 37/0075 473/353 |
| 2012/0021851 | A1* | 1/2012 | Hogge | A63B 43/008 473/373 |
| 2014/0187357 | A1* | 7/2014 | Tago | A63B 45/00 473/385 |
| 2018/0178076 | A1* | 6/2018 | Hayashi | C08L 91/00 |
| 2020/0001138 | A1* | 1/2020 | Shinohara | A63B 37/0077 |

* cited by examiner

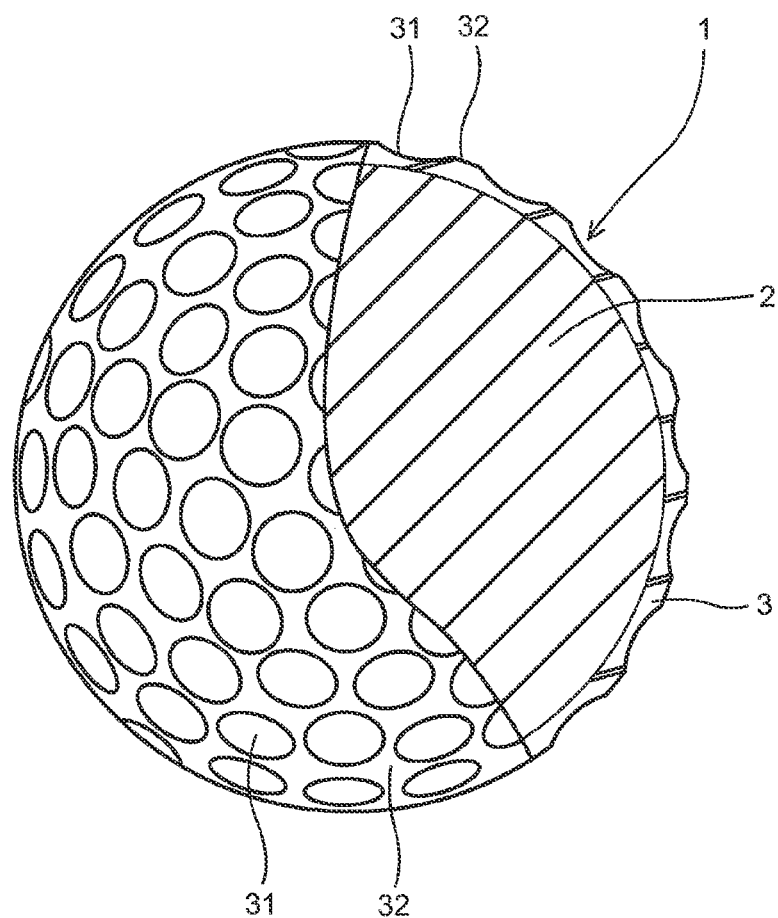

GOLF BALL

FIELD OF THE INVENTION

The present invention relates to a golf ball, and particularly relates to a colored golf ball comprising a cover containing a fluorescent pigment.

DESCRIPTION OF THE RELATED ART

Generally, a golf ball has a white color. In case of a bad weather such as rain, cloud, fog and dim conditions, it is difficult to follow the trajectory of a white golf ball and visually recognize the spot where the golf ball falls. Moreover, when a white golf ball stops on withered lawn, it is difficult to find the golf ball even if the golf ball is just nearby. In addition, recently, golf players desiring fashionability of a golf ball are increasing. In view of the above problems, a colored golf ball has been proposed to satisfy the requirements of fashionable appearance and good visibility in a bad weather.

It is important for the dye or pigment added in the colored golf ball to have high color development stability. Thus, Japanese Patent Publication No. 2018-102561 A discloses a golf ball comprising a core and a cover covering the core, wherein the cover is formed from a resin composition containing a first base resin and a fluorescent pigment, the fluorescent pigment is a fluorescent pigment having a fluorescent dye dispersed in a second base resin, and an absolute value (|SP1-SP2|) of a difference between a solubility parameter value (SP1) $((cal/cm^3)^{0.5})$ of the first base resin and a solubility parameter value (SP2) $((cal/cm^3)^{0.5})$ of the second base resin is 6 or less.

Japanese Patent Publication No. 2010-012250 A discloses a colored golf ball comprising a core, a cover having a plurality of dimples formed on an outside surface thereof, and an inside layer in contact with the cover, which ball satisfies the following conditions: (i) a color difference $\Delta E^*$ between the inside layer and the ball is at least 30; (ii) the inside layer has a lightness $L^*$ value of at least 82 and a chroma C represented by $(a^{*2}+b^{*2})^{1/2}$ of at most 10, when expressed in the $L^*a^*b^*$ color system based on JIS Z8729; (iii) the ball has a lightness $L^*$ value of at least 50; (iv) the lightness $L^*$ value of the ball the lightness $L^*$ value of the inside layer; (v) the inside layer has a transparency of at most 10% of a total transmittance and at most 1.0% of a parallel transmittance; and (vi) the cover has a transparency of at least 50% of the total transmittance and at least 1.0% of the parallel transmittance.

Japanese Patent Publication No. 2010-246642 A discloses a golf ball comprising: a core, a cover of at least one layer encasing the core, and a coat of paint applied to a surface of an outermost layer of the cover, wherein the outermost cover layer or the coat of paint or both is colored with a fluorescent pigment, and the ball has a color tone, at a measurement area diameter of 5 mm in a method of measuring the color of a reflecting object according to JIS Z-8722, which, expressed in the Lab color system, satisfies the conditions $30 \leq L$, $-40 \leq a \leq 60$, and $-20 \leq b \leq 60$.

SUMMARY OF THE INVENTION

Conventionally, a colored golf ball has been proposed. However, there is still room for improvement in the color development stability of the dye or pigment. The present invention has been made in view of the above problems. An object of the present invention is to provide a golf ball having excellent color development stability.

The present invention that has solved the above problem provides a golf ball comprising a core and a cover covering the core, wherein the cover is formed from a resin composition containing a first base resin and a fluorescent pigment, and the fluorescent pigment has a number-based cumulative median size of 2.5 μm or more. If the number-based cumulative median size of the fluorescent pigment is 2.5 μm or more, the fluorescent pigment has a small surface area per unit volume, and the contact area between the fluorescent pigment and the first base resin is lowered. Thus, migration of the fluorescent dye contained in the fluorescent pigment towards the first base resin constituting the cover is suppressed, and the cover has improved color development stability.

According to the present invention, a colored golf ball having excellent color development stability is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core and a cover covering the core, wherein the cover is formed from a cover resin composition containing a first base resin and a fluorescent pigment, and the fluorescent pigment has a number-based cumulative median size of 2.5 μm or more. If the number-based cumulative median size of the fluorescent pigment is 2.5 μm or more, the fluorescent pigment has a small surface area per unit volume, and the contact area between the fluorescent pigment and the first base resin is lowered. Thus, migration of the fluorescent dye contained in the fluorescent pigment towards the first base resin constituting the cover is suppressed, and the cover has improved color development stability.

[Cover Resin Composition]

The cover resin composition contains a first base resin and a fluorescent pigment.

<Fluorescent Pigment>

The fluorescent pigment is a fluorescent pigment having a fluorescent dye dispersed in a second base resin. The fluorescent pigment preferably has the fluorescent dye dispersed and fixed in the second base resin. Examples of the fluorescent pigment having the fluorescent dye fixed in the second base resin include a fluorescent pigment having the fluorescent dye fixed in a thermosetting resin which is used as the second base resin; and a fluorescent pigment having the fluorescent dye fixed in a base resin by a reaction between the fluorescent dye and the base resin.

(Second Base Resin)

The second base resin is not particularly limited, a resin used for the conventional fluorescent pigment can be used, and is preferably a thermosetting resin. Examples of the second base resin include a benzoguanamine resin, an acrylic resin, and a polyester resin. As the second base resin, at least one member selected from the group consisting of the benzoguanamine resin, the acrylic resin and the polyester resin is preferable, the benzoguanamine resin is more preferable. The second base resin may be used solely, or at least two or more of them may be used in combination.

Benzoguanamine Resin

Examples of the benzoguanamine resin include a condensation product of benzoguanamine and formaldehyde.

Acrylic Resin

Examples of the acrylic resin include a polymer of acrylic acid ester and/or methacrylic acid ester. Examples of the polymer of acrylic acid ester include polymethylacrylate, polyethylacrylate, and polybutylacrylate. Examples of the polymer of methacrylic acid ester include polymethylmethacrylate, polyethylmethacrylate, and polybutylmethacrylate.

Polyester Resin

The polyester resin is not particularly limited, as long as it has a plurality of ester bonds in the main chain of the molecule. For example, a product obtained by a reaction between a dicarboxylic acid and a diol is preferable.

<Fluorescent Dye>

The fluorescent dye may be either an organic fluorescent dye or an inorganic fluorescent dye, and may be any commercially available fluorescent dye. Examples of the fluorescent dye include a thioxanthene derivative, a xanthene derivative, a perylene derivative, a peryleneimide derivative, a coumarin derivative, a thioindigo derivative, a naphthalimide derivative, and a methine derivative.

The fluorescent dye is not particularly limited, and specific examples thereof include a yellow fluorescent dye such as trade names of Lumogen F Orange™ 240 (available from BASF Ltd.); Lumogen F Yellow™ 083 (available from BASF Ltd.); Hostasol Yellow™ 3G (available from Hoechst-Celanese Corp.); Oraset Yellow™ 8GF (available from Ciba-GeiGy Corp.); Fluorol 088™ (available from BASF Ltd.); Thermoplast F Yellow™ 084 (available from BASF Ltd.); Golden Yellow™ D-304 (available from DayGlo Color Corp.); Mohawk Yellow™ D-299 (available from DayGlo Color Corp.); Potomac Yellow™ D-838 (available from DayGlo Color Corp.); and Polyfast Brilliant Red™ SB (available from Keystone Corp.).

The number-based cumulative median size (50% size, D50) (a particle size corresponding to a cumulative percentage of 50% in a number-based cumulative distribution defining a small particle size side as 0%) of the fluorescent pigment is 2.5 μm or more, preferably 2.6 μm or more, more preferably 2.7 μm or more, and even more preferably 3.0 μm or more. If the cumulative median size is 2.5 μm or more, the fluorescent pigment has a small surface area per unit volume and the contact area between the fluorescent pigment and the first base resin is lowered, thus the color development stability is improved. In addition, the cumulative median size is preferably 100 μm or less, more preferably 80 μm or less, even more preferably 50 μm or less, and most preferably 20 μm or less. If the cumulative median size is 100 μm or less, the particle of the fluorescent pigment is not excessively large and thus the color development is stable.

The number-based 10% size (D10) (a particle size corresponding to a cumulative percentage of 10% in the number-based cumulative distribution defining the small particle size side as 0%) of the fluorescent pigment is preferably 1.3 μm or more, more preferably 1.4 μm or more, and even more preferably 1.5 μm or more. If the 10% size is 1.3 μm or more, the agglomeration of the fluorescent pigment is suppressed and thus the color development is better.

The number-based 90% size (D90) (a particle size corresponding to a cumulative percentage of 90% in the number-based cumulative distribution defining the small particle size side as 0%) of the fluorescent pigment is preferably 250 μm or less, more preferably 230 μm or less, even more preferably 200 μm or less, and most preferably 30 μm or less. If the 90% size is 250 μm or less, the particle of the fluorescent pigment is not excessively large and thus the fluorescent pigment has better dispersibility.

The difference (D90-D10) between the 10% size (D10) and the 90% size (D90) is preferably 0.5 μm or more, more preferably 1.0 μm or more, and even more preferably 2.0 μm or more, and is preferably 10 μm or less, more preferably 8.0 μm or less, and even more preferably 6.0 μm or less. If the difference (D90-D10) falls within the above range, the fluorescent pigment has a stable particle distribution, and thus the cover composition is more excellent in the moldability.

The number-based mode size of the fluorescent pigment is preferably 2.0 μm or more, more preferably 2.2 μm or more, and even more preferably 2.3 μm or more, and is preferably 100 μm or less, more preferably 80 μm or less, even more preferably 50 μm or less, and most preferably 15 μm or less. If the mode size is 2.0 μm or more, the fluorescent pigment has a small surface area per unit volume and the contact area between the fluorescent pigment and the first base resin is lowered, thus the color development stability is better. If the mode size is 100 μm or less, the particle of the fluorescent pigment is not excessively large and thus the color development is stable. The mode size is a particle size having a maximum value (most frequent value) in the number-based frequency distribution graph.

The number-based cumulative median size (50% size), 10% size, 90% size and mode size of the fluorescent pigment can be calculated from the image obtained by taking a photograph of the fluorescent pigment powder used as the raw material with an electron microscope. It is noted that the particle size of the fluorescent pigment does not vary even after the preparation of the cover composition and after the molding of the cover, so the particle size of the fluorescent pigment can also be measured by observing a slab formed from the cover composition or a molded cover with an electron microscope.

The density of the fluorescent pigment is preferably 1.300 g/cm$^3$ or more, and is preferably 3.0 g/cm$^3$ or less, more preferably 1.355 g/cm$^3$ or less. If the density of the fluorescent pigment falls within the above range, separation of the fluorescent pigment from the base resin when molding the cover is suppressed. It is noted that the density is a ratio (mass/volume) of the mass of the fluorescent pigment to the volume of the fluorescent pigment having this mass.

The particle shape of the fluorescent pigment is not particularly limited, examples thereof include a spherical shape, an approximately spherical shape, an ellipsoidal shape, an approximately ellipsoidal shape, and an irregular shape, and the spherical shape or the approximately spherical shape is preferable. If the particle shape is the spherical shape or the approximately spherical shape, the surface area per unit volume is small, and thus the cover has further enhanced color development stability.

The amount of the fluorescent pigment is preferably 0.1 part by mass or more, more preferably 0.3 part by mass or more, even more preferably 0.5 part by mass or more, and most preferably 1.0 part by mass or more, and is preferably 10 parts by mass or less, more preferably 9 parts by mass or less, even more preferably 8 parts by mass or less, and most preferably 5 parts by mass or less, with respect to 100 parts by mass of the first base resin. If the amount of the fluorescent pigment falls within the above range, the fluorescent pigment has sufficient color development.

(First Base Resin)

The first base resin is not particularly limited, and a resin used for the cover of the conventional golf ball can be used. Examples of the first base resin include a polyurethane resin, an ionomer resin, an amide resin, and a styrene-based elastomer. The cover resin composition preferably contains at least one member selected from the group consisting of the urethane resin, the ionomer resin and the amide resin as the first base resin. The first base resin may be used solely or at least two of them may be used in combination.

(Polyurethane Resin)

The polyurethane resin is not particularly limited, as long as it has a plurality of urethane bonds in the molecule. Examples of the polyurethane resin include a product having urethane bonds formed in the molecule by a reaction between a polyisocyanate and a high molecular weight polyol, and where necessary, further by a chain extension reaction with a chain extender such as a low molecular weight polyol or a low molecular weight polyamine. As the polyurethane resin, a thermoplastic polyurethane is preferable.

The polyisocyanate component constituting the polyurethane resin is not particularly limited, as long as it has two or more isocyanate groups. Examples of the polyisocyanate component include an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI). The above polyisocyanate component may be used solely or as a mixture of two of them.

From the viewpoint of enhancing abrasion resistance, the polyisocyanate component constituting the polyurethane resin is preferably the aromatic polyisocyanate. If the aromatic polyisocyanate is used, the obtained polyurethane has enhanced mechanical properties, and thus the obtained cover has excellent abrasion resistance. Further, from the viewpoint of enhancing weather resistance, the polyisocyanate component constituting the polyurethane resin is preferably the non-yellowing polyisocyanate (such as TMXDI, XDI, HDI, $H_6$XDI, IPDI, $H_{12}$MDI, and NBDI), and more preferably 4,4'-dicyclohexylmethane diisocyanate ($H_{12}$MDI). Since 4,4'-dicyclohexylmethane diisocyanate ($H_{12}$MDI) has a rigid structure, the obtained polyurethane has enhanced mechanical properties, and the obtained cover has excellent abrasion resistance.

The polyol component constituting the polyurethane resin is not particularly limited, as long as it has a plurality of hydroxy groups. Examples of the polyol component include a low molecular weight polyol and a high molecular weight polyol. Examples of the low molecular weight polyol include a diol such as ethylene glycol, diethylene glycol, triethylene glycol, propanediol (e.g. 1,2-propanediol, 1,3-propanediol, and 2-methyl-1,3-propanediol), dipropylene glycol, butanediol (e.g. 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, 1,6-cyclohexanedimethylol, aniline based diol, and bisphenol A based diol; a triol such as glycerin, trimethylolpropane, hexanetriol; and a tetraol or hexaol such as pentaerythritol, and sorbitol.

Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyol may be used solely or as a mixture of two of them.

The number average molecular weight of the high molecular weight polyol is preferably 400 or more, and more preferably 1,000 or more, without any limitation. If the number average molecular weight of the high molecular weight polyol is 400 or more, the obtained polyurethane is not excessively hard, and thus the golf ball has enhanced shot feeling. In addition, the number average molecular weight of the high molecular weight polyol is preferably 10,000 or less, and more preferably 8,000 or less, without any limitation. It is noted that the number average molecular weight of the polyol component can be measured, for example, by gel permeation chromatography (GPC), using polystyrene as a standard substance, tetrahydrofuran as an eluate, and two columns of TSK-GEL SUPERH2500 (available from Toso Corporation) as a column.

In addition, the polyamine constituting the polyurethane resin, which is used where necessary, is not particularly limited, as long as it has at least two amino groups. Examples of the polyamine include an aliphatic polyamine such as ethylene diamine, propylene diamine, butylene diamine and hexamethylene diamine; an alicyclic polyamine such as isophorone diamine and piperazine; and an aromatic polyamine.

The aromatic polyamine is not particularly limited, as long as it has at least two amino groups directly or indirectly bonded to an aromatic ring. Herein, "indirectly bonded to an aromatic ring" means that the amino group is bonded to an aromatic ring, for example, via a lower alkylene group. The aromatic polyamine may be, for example, a monocyclic aromatic polyamine having two or more amino groups bonded to one aromatic ring, or a polycyclic aromatic polyamine having two or more aminophenyl groups which have at least one amino group bonded to one aromatic ring.

Examples of the monocyclic aromatic polyamine include a type having amino groups directly bonded to an aromatic ring, such as phenylene diamine, toluene diamine, diethyltoluene diamine, and dimethylthiotoluene diamine; and a type having amino groups bonded to an aromatic ring via a lower alkylene group, such as xylylene diamine. In addition, the polycyclic aromatic polyamine may be a poly(aminobenzene) having at least two aminophenyl groups directly bonded to each other, or a polyamine having at least two aminophenyl groups bonded to each other via a lower alkylene group or an alkylene oxide group. Among them, a diaminodiphenyl alkane having two aminophenyl groups bonded to each other via a lower alkylene group is preferable, and 4,4'-diaminodiphenylmethane and derivatives thereof are particularly preferable.

Examples of the constitution embodiment of the polyurethane resin include, but is not particularly limited to, an embodiment where the polyurethane resin is composed of the polyisocyanate component and the high molecular weight polyol component; an embodiment where the polyurethane resin is composed of the polyisocyanate component, the high molecular weight polyol component and the low molecular weight polyol component; an embodiment where the polyurethane resin is composed of the polyisocyanate component, the high molecular weight polyol component, the low molecular weight polyol component and the polyamine component; and an embodiment where the polyurethane resin is composed of the polyisocyanate component, the high molecular weight polyol component and the polyamine component The slab hardness of the polyurethane resin is preferably 20 or more, more preferably 26 or more, and is preferably 55 or less, more preferably 52 or less, and even more preferably 49 or less in Shore D hardness. If the hardness of the polyurethane resin is 20 or more in Shore D hardness, the cover composition is not excessively soft, and thus better resilience performance is obtained. In addition, if the hardness of the polyurethane resin is 55 or less in Shore D hardness, the cover composition is not excessively hard, and thus better durability is obtained. Specific examples of the polyurethane resin include Elastollan (registered trademark) 1195ATR, ET880, 1198ATR, 1154D, NY82A" available from BASF Japan Ltd.

(Ionomer Resin)

Examples of the ionomer resin include an ionomer resin consisting of a metal ion-neutralized product of a binary copolymer composed of an olefin and an α,β-unsaturated carboxylic acid having 3 to 8 carbon atoms (hereinafter, sometimes referred to as "binary ionomer resin"); an ionomer resin consisting of a metal ion-neutralized product of a ternary copolymer composed of an olefin, an α,β-unsaturated carboxylic acid having 3 to 8 carbon atoms and α,β-unsaturated carboxylic acid ester (hereinafter, sometimes referred to as "ternary ionomer resin"); and a mixture thereof.

The olefin is preferably an olefin having 2 to 8 carbon atoms. Examples of the olefin include ethylene, propylene, butene, pentene, hexene, heptane and octene, and ethylene is preferable. Examples of the α,β-unsaturated carboxylic acid having 3 to 8 carbon atoms include acrylic acid, methacrylic acid, fumaric acid, maleic acid, and crotonic acid, and acrylic acid and methacrylic acid are preferable.

The α,β-unsaturated carboxylic acid ester is preferably an alkyl ester of an α,β-unsaturated carboxylic acid having 3 to 8 carbon atoms, more preferably the alkyl ester of acrylic acid, methacrylic acid, fumaric acid or maleic acid, and even more preferably the alkyl ester of acrylic acid or the alkyl ester of methacrylic acid. Examples of the alkyl group constituting the ester include methyl, ethyl, propyl, n-butyl, and isobutyl ester.

As the binary ionomer resin, a metal ion-neutralized product of an ethylene-(meth)acrylic acid binary copolymer is preferable. As the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary copolymer constituting the binary ionomer resin and the ternary copolymer constituting the ternary ionomer resin is preferably 4 mass % or more, more preferably 6 mass % or more, and even more preferably 8 mass % or more, and is preferably 50 mass % or less, more preferably 30 mass % or less, even more preferably 20 mass % or less, and most preferably 15 mass % or less. If the amount of the α,β-unsaturated carboxylic acid component having 3 to 8 carbon atoms is 4 mass % or more, the binary ionomer resin and the ternary ionomer resin have higher resilience, and if the amount of the α,β-unsaturated carboxylic acid component having 3 to 8 carbon atoms is 50 mass % or less, the binary ionomer resin and the ternary ionomer resin have enhanced softness.

Examples of the metal ion for neutralizing at least a part of carboxyl groups of the binary ionomer resin and/or the ternary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium. The binary ionomer resin and the ternary ionomer resin are preferably neutralized with at least one metal ion selected from the group consisting of $Na^+$, $Mg^{2+}$, $Ca^{2+}$ and $Zn^{2+}$.

The neutralization degree of the carboxyl groups of the binary ionomer resin and the ternary ionomer resin is preferably 15 mole % or more, more preferably 20 mole % or more, and even more preferably 50 mole % or more, and is preferably 100 mole % or less, more preferably 85 mole % or less. If the neutralization degree is 15 mole % or more, the obtained golf ball has better resilience and durability. On the other hand, if the neutralization degree is 100 mole % or less, the golf ball resin composition has better fluidity (better moldability). It is noted that the neutralization degree of the carboxyl groups of the ionomer resin can be calculated by the following expression.

Neutralization degree of ionomer resin (mole %)=100×mole number of neutralized carboxyl groups in copolymer/mole number of all carboxyl groups in copolymer As the binary ionomer resin and the ternary ionomer resin, an ionomer resin which has been neutralized in advance can be used, or a blend of a metal compound with a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester can be used. In addition, each of the binary ionomer resin and the ternary ionomer resin may be used solely, or two or more of them may be used in combination.

The metal compound is not particularly limited, as long as it can neutralize a carboxyl group. Examples of the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate.

Examples of the binary ionomer resin include Himilan (registered trademark) 1555 (Na), 1557 (Zn), 1605 (Na), 1706 (Zn), 1707 (Na), AM7311 (Mg), AM7329 (Zn) (available from Dow-Mitsui Polychemicals Co., Ltd.); Surlyn (registered trademark) 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) (available from E.I. du Pont de Nemours and Company); and Iotek (registered trademark) 8000 (Na), 8030 (Na), 7010 (Zn), 7030 (Zn) (available from ExxonMobil Chemical Corporation).

Examples of the ternary ionomer resin include Himilan AM7327 (Zn), 1855 (Zn), 1856 (Na), AM7331 (Na) (available from Dow-Mitsui Polychemicals Co., Ltd.); Surlyn 6320 (Mg), 8120 (Na), 8320 (Na), 9320 (Zn), 9320W (Zn), HPF1000 (Mg), HPF2000 (Mg) (available from E.I. du Pont de Nemours and Company); and Iotek 7510 (Zn), 7520 (Zn) (available from ExxonMobil Chemical Corporation).

Examples of the binary copolymer include Nucrel (registered trademark) N1050H, N2050H, N1110H, N0200H (available from Dow-Mitsui Polychemicals Co., Ltd.); and Primacor (registered trademark) 59801 (available from Dow Chemical Company). Examples of the ternary copolymer include Nucrel AN4318, AN4319 (available from Dow-Mitsui Polychemicals Co., Ltd.); and Primacor AT310, AT320 (available from Dow Chemical Company). It is noted that Na, Zn, Li, Mg and the like described in the parentheses after the trade names indicate metal types of neutralizing metal ions of the ionomer resins.

(Polyamide Resin)

The polyamide is not particularly limited, as long as it is a thermoplastic resin having a plurality of amide bonds (—NH—CO—) in the main chain of the molecule. Examples of the polyamide include a product having amide bonds formed in the molecule, obtained by a ring-opening polymerization of a lactam or by a reaction between a diamine component and a dicarboxylic acid component.

Examples of the polyamide resin include an aliphatic polyamide such as polyamide 6, polyamide 11, polyamide 12, polyamide 66, polyamide 610, polyamide 6T, polyamide 6I, polyamide 9T, polyamide MST, and polyamide 612; and an aromatic polyamide such as poly-p-phenylene terephthalamide and poly-m-phenylene isophthalamide. These polyamide resins may be used solely, or two or more of them may be used in combination. Among them, the aliphatic polyamide such as polyamide 6, polyamide 66, polyamide 11, and polyamide 12 is preferable.

Specific examples of the polyamide resin include trade names of "Rilsan (registered trademark) B (e.g. Rilsan BESN TL, BESN P20 TL, BESN P40 TL, MB3610, BMF O, BMN O, BMN O TLD, BMN BK TLD, BMN P20 D, BMN P40 D)" available from Arkema K. K.; and "Pebax (registered trademark) 2533, 3533, 4033, 5533" available from Arkema K. K.

(Styrene-Based Elastomer)

As the styrene-based elastomer, an elastomer containing a styrene block can be suitably used. The elastomer containing the styrene block has a polystyrene block as a hard segment, and a soft segment. The typical soft segment is a diene block. Examples of the constituent component of the diene block include butadiene, isoprene, 1,3-pentadiene and 2,3-dimethyl-1,3-butadiene, and butadiene and isoprene are preferable. Two or more of the constituent components may be used in combination.

Examples of the elastomer containing the styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS, and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the elastomer containing the styrene block is preferably 10 mass % or more, more preferably 12 mass % or more, and even more preferably 15 mass % or more. From the viewpoint of the shot feeling of the obtained golf ball, the amount is preferably 50 mass % or less, more preferably 47 mass % or less, and even more preferably 45 mass % or less.

Examples of the elastomer containing the styrene block further include an alloy of a polyolefin with one member or at least two members selected from the group consisting of SBS, SIS, SIBS, SEBS, SEPS, SEEPS and their hydrogenated products. It is estimated that the olefin component in the alloy contributes to improving the compatibility with the ionomer resin. If the alloy is used, the resilience performance of the golf ball is enhanced. An olefin having 2 to 10 carbon atoms is preferably used. Preferable examples of the olefin include ethylene, propylene, butene, and pentene. Ethylene and propylene are particularly preferable.

Specific examples of the polymer alloy include "TEFABLOC (registered trademark) T3221C, T3339C, SJ4400N, SJ5400N, SJ6400N, SJ7400N, SJ8400N, SJ9400N, SR04" available from Mitsubishi Chemical Corporation. Other specific example of the elastomer containing the styrene block include "Epofriend A1010" available from Daicel Chemical Industries, Ltd, and "Septon HG-252" available from Kuraray Co., Ltd.

(Ultraviolet Absorber and Light Stabilizer)

The fluorescent pigment has a low light stability, so the cover resin composition preferably contains an ultraviolet absorber or a light stabilizer. The ultraviolet absorber or the light stabilizer is not particularly limited, and any commercially available product can be used. Examples of the ultraviolet absorber include a salicyclic acid derivative, a benzophenone derivative, a benzotriazole derivative, a cyanoacrylate derivative, a triazine derivative, and a nickel complex. Examples of the light stabilizer include a hindered amine derivative.

Examples of the salicyclic acid derivative ultraviolet absorber include phenyl salicylate, p-t-butylphenyl salicylate, and p-octylphenyl salicylate; examples of the benzophenone derivative ultraviolet absorber include 2,4-dihydroxybenzophenone, 2-hydroxy-4-methoxybenzophenone, 2-hydroxy-4-octyloxybenzophenone, and 2,2-dihydroxy-4,4'-methoxybenzophenone; examples of the benzotriazole derivative ultraviolet absorber include 2-(2'-hydroxy-5'-methylphenyl) benzotriazole, 2-(2'-hydroxy-5'-t-butylphenyl) benzotriazole, 2-(2'-hydroxy-3'-t-butyl-5'-methylphenyl)-5-chlorobenzotriazole, 2-[2-hydroxy-3,5-bis($\alpha,\alpha'$-dimethylbenzyl)phenyl]-2H-benzotriazole, and 2-(5-methyl-2-hydroxyphenyl) benzotriazole; examples of the cyanoacrylate derivative ultraviolet absorber include 2-ethylhexyl-2-cyano-3,3'-diphenyl acrylate and ethyl-2-cyano-3,3'-diphenyl acrylate; examples of the triazine derivative ultraviolet absorber include 2-(4,6-diphenyl-1,3,5-triazine-2-yl)-5[(hexyl)oxy]-phenol, 2,4-bis(2-hydroxy-4-butyloxyphenyl)-6-(2,4-bis-butyloxyphenyl)-1,3,5-triazine, and 2-(4-{[2-hydroxy-3-(2'-ethyl) hexyl]oxy}-2-hydroxyphenyl)-4,6-bis(2,4-dimethylphenyl)-1,3,5-triazine. Specific examples include "Sumisorb 130" and "Sumisorb 140" (both of which are benzophenone ultraviolet absorber) available from Sumitomo Chemical Co., Ltd.; "TINUVIN 234", "TINUVIN 900", "TINUVIN 326" and "TINUVIN P" (all of which are benzotriazole ultraviolet absorber) available from Chiba Specialty Chemicals Co., Ltd.; "Uvinul N-35" (which is cyanoacrylate ultraviolet absorber) available from BASF Ltd.; and "TINUVIN 1577", "TINUVIN 460" and "TINUVIN 405" (all of which are triazine ultraviolet absorber) available from Chiba Specialty Chemicals Co., Ltd. These ultraviolet absorbers may be used solely, or two or more of them may be used in combination. It is noted that the ultraviolet absorber possibly used in the present invention is not limited to the above-described ultraviolet absorbers, any conventional ultraviolet absorber can be used.

Examples of the hindered amine derivative light stabilizer include bis(1,2,2,6,6-pentamethyl-4-piperidyl){[3,5-bis(1,1'-dimethylethyl)-4-hydroxyphenyl]methyl}butyl malonate, 1-{2-[3-(3,5-di-t-butyl-4-hydroxyphenyl)propionyloxy] ethyl}-4-[3-(3,5-di-t-butyl-4-hydroxyphenyl)propionyloxy]-2,2,6,6-tetramethylpiperidine, and bis(2,2,6,6-tetramethyl-4-piperidyl) sebacate. Specific examples include "Sanol LS-2626" and "TINUVIN 144" available from Chiba Specialty Chemicals Co., Ltd.; and "JF-90" available from Johoku Chemicals Co., Ltd.

(Titanium Oxide)

Although the cover containing the fluorescent pigment is preferably transparent or translucent, the cover may contain titanium oxide. If the fluorescent pigment and a small amount of titanium oxide are used in combination, a translucent cover having a vivid color is obtained. Titanium oxide has high opacity, and thus the amount of titanium oxide is preferably 0.001 part by mass or more, more preferably 0.002 part by mass or more, and even more preferably 0.005 part by mass or more, and is preferably less than 0.5 part by mass, more preferably 0.45 part by mass or less, and even more preferably 0.3 part by mass or less, with respect to 100 parts by mass of the resin component. If the amount of titanium oxide is 0.001 part by mass or more, a translucent cover having a vivid color is obtained, and if the amount of titanium oxide is 0.5 part by mass or more, the cover tends to show opacity.

(Other Component)

In addition to the above-described components, the resin composition may further contain a pigment component, a weight adjusting agent such as zinc oxide, calcium carbonate and barium sulfate, a dispersant, an antioxidant, a fluorescent brightener, a lubricant, a light stabilizer, or the like, as long as they do not impair the performance of the cover.

The cover resin composition can be obtained, for example, by dry blending the first base resin, the fluorescent pigment and the additives to be added where necessary. In addition, the dry blended mixture may be extruded into a pellet form. In the dry blending, for example, a mixer capable of blending materials in a pellet form is preferably used, and a tumbler type mixer is more preferably used. Extruding can be carried out with a conventional extruder such as a single-screw extruder, a twin-screw extruder, and a twin-single screw extruder.

[Golf Ball]

The construction of the golf ball according to the present invention is not particularly limited, as long as the golf ball according to the present invention comprises a spherical core and a cover covering the spherical core. Examples of the construction of the golf ball include a two-piece golf ball having a single layered spherical core and a cover covering the spherical core; a three-piece golf ball having a spherical core composed of a center and one intermediate layer covering the center, and a cover covering the spherical core; and a multi-piece golf ball having a spherical core composed of a center and two or more intermediate layers covering the center, and a cover covering the spherical core.

The conventional rubber composition (hereinafter, sometimes simply referred to as "core rubber composition") can be used in the core or center. For example, the core or center can be formed by heat-pressing a rubber composition containing a base rubber, a co-crosslinking agent and a crosslinking initiator.

As the base rubber, particularly preferred is a high-cis polybutadiene having a cis-1,4 bond in an amount of 40 mass % or more, preferably 70 mass % or more, and more preferably 90 mass % or more in view of its superior resilience. The co-crosslinking agent is preferably an α,β-unsaturated carboxylic acid having 3 to 8 carbon atoms or a metal salt thereof, more preferably a metal salt of acrylic acid or a metal salt of methacrylic acid. The metal constituting the metal salt is preferably zinc, magnesium, calcium, aluminum or sodium, more preferably zinc. The amount of the co-crosslinking agent is preferably 20 parts by mass or more and 50 parts by mass or less with respect to 100 parts by mass of the base rubber. When the α,β-unsaturated carboxylic acid having 3 to 8 carbon atoms is used as the co-crosslinking agent, a metal compound (e.g. magnesium oxide) is preferably blended. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

In addition, the core rubber composition may further contain an organic sulfur compound. As the organic sulfur compound, diphenyl disulfides, thiophenols and thionaphthols can be suitably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. The carboxylic acid and/or the salt thereof is preferably a carboxylic acid having 1 to 30 carbon atoms and/or a salt thereof. As the carboxylic acid, an aliphatic carboxylic acid or an aromatic carboxylic acid (such as benzoic acid) can be used. The amount of the carboxylic acid and/or the salt thereof is 1 part by mass or more and 40 parts by mass or less with respect to 100 parts by mass of the base rubber.

The core rubber composition may further appropriately contain a weight adjusting agent such as zinc oxide and barium sulfate, an antioxidant, a colored powder, or the like, in addition to the base rubber, the co-crosslinking agent, the crosslinking initiator and the organic sulfur compound. Molding conditions of heat-pressing the core rubber composition can be set appropriately in accordance with the rubber formulation. Generally, it is preferred that the core rubber composition is heated at a temperature of 130° C. to 200° C. for 10 minutes to 60 minutes, or alternatively the core rubber composition is subjected to a two-step heating, i.e. the core rubber composition is heated at a temperature of 130° C. to 150° C. for 20 minutes to 40 minutes and then heated at a temperature of 160° C. to 180° C. for 5 minutes to 15 minutes.

When the spherical core comprises an intermediate layer, examples of the intermediate layer material include a thermoplastic resin such as a polyurethane resin, an ionomer resin, a polyamide resin and a polyethylene; a thermoplastic elastomer such as a styrene elastomer, a polyolefin elastomer, a polyurethane elastomer, a polyamide elastomer and a polyester elastomer; and a cured product of a rubber composition. Herein, examples of the ionomer resin include a product obtained by neutralizing at least a part of carboxyl groups in a copolymer composed of ethylene and an α,β-unsaturated carboxylic acid with a metal ion; and a product obtained by neutralizing at least a part of carboxyl groups in a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, a pigment, and the like.

The method for molding the intermediate layer is not particularly limited, and examples thereof include a method which comprises molding the intermediate layer composition into hemispherical half shells in advance, covering the spherical body with two of the half shells and performing compression molding; and a method which comprises injection molding the intermediate layer composition directly onto the spherical body to cover the spherical body.

When the intermediate layer is molded by injection molding the intermediate layer composition onto the spherical body, upper and lower molds having a hemispherical cavity are preferably used as the upper and lower molds for molding. When molding the intermediate layer by injection molding, the hold pin is protruded to hold the spherical body to be covered, and the heated and melted intermediate layer composition is charged and cooled to form the intermediate layer.

When molding the intermediate layer by the compression molding method, molding of the half shell can be performed by either the compression molding method or the injection molding method, and the compression molding method is preferred. Compression molding the intermediate layer composition into the half shell can be carried out, for example, under a pressure of 1 MPa or more and 20 MPa or less at a molding temperature of −20° C. or more and 70° C. or less relative to the flow beginning temperature of the intermediate layer composition. By performing the molding under the above conditions, the half shell having a uniform thickness can be formed. Examples of the method for molding the intermediate layer by using the half shell include a method which comprises covering the spherical body with two of the half shells and then performing compression molding. Compression molding the half shells into the intermediate layer can be carried out, for example, under a molding pressure of 0.5 MPa or more and 25 MPa or less at a molding temperature of −20° C. or more and 70° C. or less relative to the flow beginning temperature of the intermediate layer composition. By performing the molding under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the thermoplastic resin composition can be measured with "Flow Tester CFT-500" available from Shimadzu Corporation, by using the thermoplastic resin composition in a pellet form under the following conditions.

Measuring conditions: Plunger area: 1 cm$^2$, Die length: 1 mm, Die diameter: 1 mm, Load: 588.399 N, Starting temperature: 30° C., and Temperature increasing rate: 3° C./min.

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick and thus the resilience is better. On the other hand, if the diameter of the spherical core is 42.2 mm or less, the cover is not excessively thin and thus the cover functions better.

The method of molding the cover composition into the cover is not particularly limited, and examples thereof include a method which comprises injection molding the cover composition directly onto the spherical core; and a method which comprises molding the cover composition into hollow shells, covering the spherical core with a plurality of the shells and performing compression molding (preferably a method which comprises molding the cover composition into a hollow half shell, covering the spherical core with two of the half shells and performing compression molding). The golf ball body having the cover formed thereon is ejected from the mold, and is preferably subjected to surface treatments such as deburring, cleaning and sandblast where necessary. In addition, if desired, a mark may be formed.

The thickness of the cover is preferably 0.3 mm or more, more preferably 0.4 mm or more, and even more preferably 0.5 mm or more, and is preferably 2.0 mm or less, more preferably 1.5 mm or less, and even more preferably 1.0 mm or less. If the thickness of the cover is 0.3 mm or more, the cover is more easily molded, and if the thickness of the cover is 2.0 mm or less, the core has a relatively large diameter, and thus the golf ball has enhanced resilience performance.

The total number of the dimples formed on the cover is preferably 200 or more and 500 or less. If the total number of the dimples is less than 200, the dimple effect is hardly obtained. On the other hand, if the total number of the dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball according to the present invention preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

The FIGURE is a partially cutaway cross-sectional view of a golf ball 1 according to one embodiment of the present invention. The golf ball 1 comprises a spherical core 2, and a cover 3 covering the spherical core 2. A plurality of dimples 31 are formed on the surface of the cover. Other portions than the dimples 31 on the surface of the golf ball 1 are lands 32. The golf ball 1 is provided with a paint layer and a mark layer on an outer side of the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

[Evaluation Method]

(1) Density of Fluorescent Pigment

The density of the fluorescent pigment was measured with an automatic true density tester (BELPycno available from MicrotracBEL Corp.). The measuring conditions were a usage gas of helium, a sample chamber volume of 10 cm$^3$, and a measuring temperature of 23° C. The measurement was performed two times for each fluorescent pigment, and the average value thereof was adopted as the density of that fluorescent pigment.

(2) Particle Size of Pigment

A scanning electron microscope was used to take a photograph of the fluorescent pigment in a shape of powder. A circle was drawn along the contour of each pigment particle in the obtained image (field height: 17.1 μm, field width: 25.6 μm) to extract pigment particles. At least 100 particles were extracted. The particle size of the extracted particles was measured with an image processing software (ImageJ), and the number-based cumulative distribution graph (frequency distribution obtained by dividing the linearly plotted particle size of from 0 μm to 10 μm into 50 parts) was plotted. The mode size, D10 (10% size), D50 (cumulative median size, 50% size) and D90 (90% size) were obtained based on the above graph.

(3) Color Development Stability (Weather Resistance)

The golf ball was charged into a super xenon weather meter, and light was irradiated onto the golf ball for 24 hours. The indices L*, a* and b* in the CIELAB color system of each golf ball were measured with a color difference meter ("CM-3500d" available from Konica Minolta, Inc.). The index differences ΔL*, Δa* and Δb* before and after the light irradiation were calculated, and the color difference ΔE was calculated by the following expression.

$$\Delta E=[(\Delta L^*)^2+(\Delta a^*)^2+(\Delta b^*)^2]^{1/2}$$

(4) Color Development Stability (Heat Resistance)

The materials of the cover compositions were dry blended, and kneaded with a twin-screw kneading type extruder, to obtain the cover compositions in a pellet form. The conditions for extruding the cover compositions were a screw diameter of 45 mm, a screw rotational speed of 200 rpm, and screw L/D=35, and the mixture was heated to 150 to 260° C. at the die position of the extruder.

The obtained cover composition was heated at a temperature of 240° C. at the die position of the extruder, and injection molded on the spherical core without being retained in the die position, to produce the golf ball I (240° C., 0 min). In addition, the obtained cover composition was heated at 240° C. at the die position of the extruder, and injection molded on the spherical core after being retained for 20 minutes in the die position, to produce the golf ball II (240° C., 20 min).

The color of the cover of each golf ball was measured with a color difference meter ("CM-3500d" available from Konica Minolta, Inc.). The color difference value of the golf ball I was adopted as $L^*_0$, $a^*_0$, $b^*_0$, the color difference value of the golf ball II was adopted as $L^*_1$, $a^*_1$, $b^*_1$, and the color difference (ΔE) was calculated by the following expression.

$$\Delta E=[(L^*_1-L^*_0)^2+(a^*_1-a^*_0)^2+(b^*_1-b^*_0)^2]^{1/2}$$

[Production of Golf Ball]

(1) Production of Core

According to the formulation shown in Table 1, the rubber composition was kneaded with a kneading roll, and heat-pressed in upper and lower molds, each having a hemispherical cavity, at a temperature of 170° C. for 20 minutes to obtain the spherical core having a diameter of 39.7 mm.

TABLE 1

| | Core rubber composition | |
|---|---|---|
| Formulation (parts by mass) | Polybutadiene rubber | 100 |
| | Zinc acrylate | 25 |
| | Zinc oxide | 4 |
| | Titanium oxide | 2 |
| | Diphenyl disulfide | 0.6 |
| | Dicumyl peroxide | 0.6 |

The materials used in Table 1 are shown as follows.

Polybutadiene rubber: high-cis polybutadiene "BR730" (cis-1,4 bond amount=96 mass %, 1,2-vinyl bond amount=1.3 mass %, Moony viscosity (ML$_{1+4}$ (100° C.))=55, molecular weight distribution (Mw/Mn)=3) available from JSR Corporation Zinc acrylate: "ZNDA-90S" available from Nisshoku Techno Fine Chemical Co., Ltd.

Zinc oxide: "Ginrei R" available from Toho Zinc Co., Ltd.

Titanium oxide "A220" available from Ishihara Sangyo Co., Ltd.

Diphenyl disulfide: available from Sumitomo Seika Chemicals. Co. Ltd.

Dicumyl peroxide: "Percumyl (registered trademark) D" available from NOF Corporation (2) Production of Cover According to the formulations shown in Table 2 and Table 3, the materials were dry blended, and mixed with a twin-screw kneading type extruder, to obtain the cover compositions in a pellet form. The conditions for extruding the cover compositions were a screw diameter of 45 mm, a screw rotational speed of 200 rpm, and screw L/D=35, and the mixture was heated to 150 to 260° C. at the die position of the extruder. The obtained cover composition was injection molded on the spherical core obtained above such that the resultant cover had a thickness of 1.5 mm, to produce the golf balls comprising a spherical core and a cover covering the core.

TABLE 2

| | Golf ball No. | 1 | 2 | 3 | 4 |
|---|---|---|---|---|---|
| Formulation (parts by mass) | Urethane resin | 100 | 100 | 100 | 100 |
| | Wax Master VD2 | 1.5 | 1.5 | 1.5 | 1.5 |
| | Titanium oxide | 0.1 | 0.1 | 0.1 | 0.1 |
| | JF-90 | 0.2 | 0.2 | 0.2 | 0.2 |
| | EPO Color FP3000 | 3 | 2 | — | — |
| | FX305 | — | 1 | 3 | — |
| | FX305S | — | — | — | 3 |

TABLE 2-continued

| | Golf ball No. | | 1 | 2 | 3 | 4 |
|---|---|---|---|---|---|---|
| Properties of fluorescent pigment | Density (g/cm³) | | 1.380 | — | 1.356 | 1.350 |
| | Number-based particle size (μm) | Mode size | 1.8 | — | 2.2 | 2.4 |
| | | D10 | 1.2 | — | 1.2 | 1.6 |
| | | D50 | 2.0 | Less than 2.5 | 2.2 | 3.2 |
| | | D90 | 2.6 | — | 3.2 | 6.0 |
| | | Difference (D90 − D10) | 1.4 | — | 2.0 | 4.4 |
| Color development stability (weather resistance) | Before light irradiation (0 h) | L* | 102 | 101 | 99 | 99 |
| | | a* | −28 | −29 | −31 | −34 |
| | | b* | 81 | 83 | 88 | 84 |
| | After light irradiation (24 h) | L* | 94 | 95 | 96 | 97 |
| | | a* | −21 | −23 | −29 | −30 |
| | | b* | 63 | 66 | 78 | 75 |
| | ΔE | | 20.9 | 18.9 | 10.6 | 10.1 |

TABLE 3

| | Golf ball No. | | 5 | 6 | 7 |
|---|---|---|---|---|---|
| Formulation (parts by mass) | Himilan 1555 | | 47 | 47 | 47 |
| | Himilan 1557 | | 46 | 46 | 46 |
| | Styrene-based elastomer | | 7 | 7 | 7 |
| | Titanium oxide | | 0.2 | 0.2 | 0.2 |
| | Zinc oxide | | 0.1 | 0.1 | 0.1 |
| | JF-90 | | 0.2 | 0.2 | 0.2 |
| | EPO Color FP3000 | | 2 | — | — |
| | FX305 | | — | 2 | — |
| | FX305S | | — | — | 2 |
| Properties of fluorescent pigment | Density (g/cm³) | | 1.380 | 1.356 | 1.350 |
| | Number-based particle size (μm) | Mode size | 1.8 | 2.2 | 2.4 |
| | | D10 | 1.2 | 1.2 | 1.6 |
| | | D50 | 2.0 | 2.2 | 3.2 |
| | | D90 | 2.6 | 3.2 | 6.0 |
| | | Difference (D90−D10) | 1.4 | 2.0 | 4.4 |
| Color development stability (heat resistance) | 240° C., 0 min | L* | 105 | 105 | 105 |
| | | a* | −40 | −43 | −51 |
| | | b* | 90 | 107 | 95 |
| | 240° C., 20 min | L* | 105 | 105 | 105 |
| | | a* | −40 | −43 | −51 |
| | | b* | 88 | 106 | 94 |
| | ΔE | | 2.0 | 1.0 | 0.4 |
| Color development stability (weather resistance) | Before light irradiation (0 h) | L* | 102 | 101 | 102 |
| | | a* | −33 | −37 | −44 |
| | | b* | 91 | 99 | 89 |
| | After light irradiation (24 h) | L* | 93 | 97 | 98 |
| | | a* | −19 | −27 | −33 |
| | | b* | 53 | 69 | 66 |
| | ΔE | | 41.5 | 32.6 | 25.0 |

The materials used in Table 2 and Table 3 are shown as follows.

Urethane resin: Elastollan (registered trademark) NY82A (polyurethane elastomer (polyol component: polytetramethylene ether glycol, polyisocyanate component: dicyclohexylmethane-4,4'-diisocyanate, chain extender: 1,4-butanediol) (Shore A hardness: 82)) available from BASF Japan Ltd.

Himilan (registered trademark) 1555: ionomer resin available from Dow-Mitsui Polychemicals Co., Ltd.

Himilan 1557: ionomer resin available from Dow-Mitsui Polychemicals Co., Ltd.

Styrene-based elastomer: TEFABLOC (registered trademark) T3221C available from Mitsubishi Chemical Corporation Wax Master VD2: lubricant available from BASF Japan Ltd.

Titanium oxide: "A220" available from Ishihara Sangyo Co., Ltd.

Zinc oxide: Pana-tetra (registered trademark) WZ-0501 available from Panasonic Corporation JF-90: light stabilizer available from Johoku Chemical Co., Ltd.

EPO Color FP3000: fluorescent pigment having fluorescent dye dispersed and fixed in benzoguanamine resin (condensation product of benzoguanamine and formaldehyde), available from Ukseung Chemical Co., Ltd.

FX305: fluorescent pigment having fluorescent dye dispersed and fixed in benzoguanamine resin (condensation product of benzoguanamine and formaldehyde), available from Sinloihi Co., Ltd.

FX305S: fluorescent pigment having fluorescent dye dispersed and fixed in benzoguanamine resin (condensation product of benzoguanamine and formaldehyde), available from Sinloihi Co., Ltd.

As shown in Tables 2 and 3, the golf balls No. 4 and 7 using the fluorescent pigment having a number-based cumulative median size of 2.5 µm or more, have excellent color development stability in the cover.

This application is based on Japanese patent application No. 2019-216325 filed on Nov. 29, 2019, the contents of which are hereby incorporated by reference.

The invention claimed is:

1. A golf ball comprising a core and a cover covering the core, wherein the cover is formed from a resin composition containing a first base resin and a fluorescent pigment,
the fluorescent pigment is a fluorescent pigment having a fluorescent dye dispersed in a second base resin, and the second base resin is a thermosetting resin, and
the fluorescent pigment has a density of 1.300 g/cm$^3$ or more and 1.355 g/cm$^3$ or less,
a number-based cumulative median size of 2.5 µm or more, and
a number-based 10% size of 1.3 µm or more.

2. The golf ball according to claim 1, wherein the first base resin contains at least one member selected from the group consisting of a urethane resin, an ionomer resin and an amide resin.

3. The golf ball according to claim 1, wherein the second base resin is a benzoguanamine resin.

4. The golf ball according to claim 1, wherein the number-based cumulative median size of the fluorescent pigment ranges from 2.5 µm to 100 µm.

5. The golf ball according to claim 1, wherein the number-based cumulative median size of the fluorescent pigment ranges from 2.5 µm to 20 µm.

6. The golf ball according to claim 1, wherein the fluorescent pigment has a number-based 90% size of 250 µm or less.

7. The golf ball according to claim 1, wherein the fluorescent pigment has a number-based mode size ranging from 2.0 µm to 100 µm.

8. The golf ball according to claim 1, wherein a difference (D90-D10) between a number-based 10% size (D10) of the fluorescent pigment and a number-based 90% size (D90) of the fluorescent pigment ranges from 0.5 µm to 10 µm.

9. The golf ball according to claim 1, wherein the fluorescent pigment is spherical or approximately spherical.

10. The golf ball according to claim 1, wherein the fluorescent pigment is contained in an amount of from 0.1 part by mass to 10 parts by mass with respect to 100 parts by mass of the first base resin.

11. The golf ball according to claim 1, wherein the cover resin composition further contains an ultraviolet absorber and/or a light stabilizer.

12. The golf ball according to claim 1, wherein the cover is transparent.

13. The golf ball according to claim 1, wherein the cover further contains titanium oxide and is translucent.

* * * * *